(12) United States Patent
Hayashi et al.

(10) Patent No.: US 10,562,481 B2
(45) Date of Patent: Feb. 18, 2020

(54) AIRBAG PACKAGE OF AN AIRBAG FOR HEAD PROTECTION

(71) Applicant: TOYODA GOSEI CO., LTD., Kiyosu-shi, Aichi-ken (JP)

(72) Inventors: Shinji Hayashi, Kiyosu (JP); Masaaki Okuhara, Kiyosu (JP); Takashi Iida, Kiyosu (JP)

(73) Assignee: TOYODA GOSEI CO., LTD., Aichi-pref. (JP)

( * ) Notice: Subject to any disclaimer, the term of this patent is extended or adjusted under 35 U.S.C. 154(b) by 14 days.

(21) Appl. No.: 16/058,220

(22) Filed: Aug. 8, 2018

(65) Prior Publication Data

US 2019/0061669 A1 Feb. 28, 2019

(30) Foreign Application Priority Data

Aug. 24, 2017 (JP) .................. 2017-161668

(51) Int. Cl.
| | |
|---|---|
| *B60R 21/232* | (2011.01) |
| *B60R 21/213* | (2011.01) |
| *B60R 21/237* | (2006.01) |
| *B60R 21/231* | (2011.01) |
| *B60R 21/233* | (2006.01) |

(52) U.S. Cl.
CPC .......... *B60R 21/232* (2013.01); *B60R 21/213* (2013.01); *B60R 21/231* (2013.01); *B60R 21/233* (2013.01); *B60R 21/237* (2013.01); *B60R 21/23138* (2013.01); *B60R 2021/23192* (2013.01)

(58) Field of Classification Search
CPC ... B60R 21/232; B60R 21/213; B60R 21/231; B60R 21/23138; B60R 21/237
See application file for complete search history.

(56) References Cited

U.S. PATENT DOCUMENTS 7,527,287 B2 * 5/2009 Kjell ..................... B60R 21/201
280/728.2
8,308,192 B2 * 11/2012 Konishi ................ B60R 21/213
280/730.2

(Continued)

FOREIGN PATENT DOCUMENTS

| JP | 2003-175792 A | 6/2003 |
|---|---|---|
| JP | 2007-091177 A | 4/2007 |

(Continued)

*Primary Examiner* — Faye M Fleming
(74) *Attorney, Agent, or Firm* — Posz Law Group, PLC

(57) ABSTRACT

An airbag package of an airbag for head protection includes a rolled portion formed by rolling a skin material of the airbag as laid flat, and a compressed region in which a void space formed at the center of the cross-sectional surface of the rolled portion has been crushed due to compression. The rolled portion includes, in the cross-sectional surface, an upper layered portion, a lower layered portion, and a pair of side layered portions that are disposed around the center of the cross-sectional surface of the rolled portion and each have layers of the skin material. In the compressed region, each of the side layered portions bends generally at the center in an up and down direction such that the bent regions butt against each other and are packed between the upper layered portion and the lower layered portion in such a manner as to fill the void space.

9 Claims, 14 Drawing Sheets

(56) References Cited

U.S. PATENT DOCUMENTS

| | | | |
|---|---|---|---|
| 9,994,187 B2* | 6/2018 | Okuhara | B60R 21/237 |
| 2007/0075530 A1 | 4/2007 | Yokoyama | |
| 2011/0101658 A1 | 5/2011 | Konishi et al. | |
| 2014/0054879 A1 | 2/2014 | Taguchi et al. | |
| 2018/0236965 A1* | 8/2018 | Fischer | B60R 21/237 |
| 2019/0061672 A1* | 2/2019 | Okuhara | B60R 21/237 |

FOREIGN PATENT DOCUMENTS

| | | |
|---|---|---|
| JP | 2009-262690 A | 11/2009 |
| JP | 2013-514233 A | 4/2013 |
| JP | 2015-157601 A | 9/2015 |
| WO | 2011/075050 A1 | 6/2011 |
| WO | 2012/147490 A1 | 11/2012 |

* cited by examiner

Fig. 4
(A)
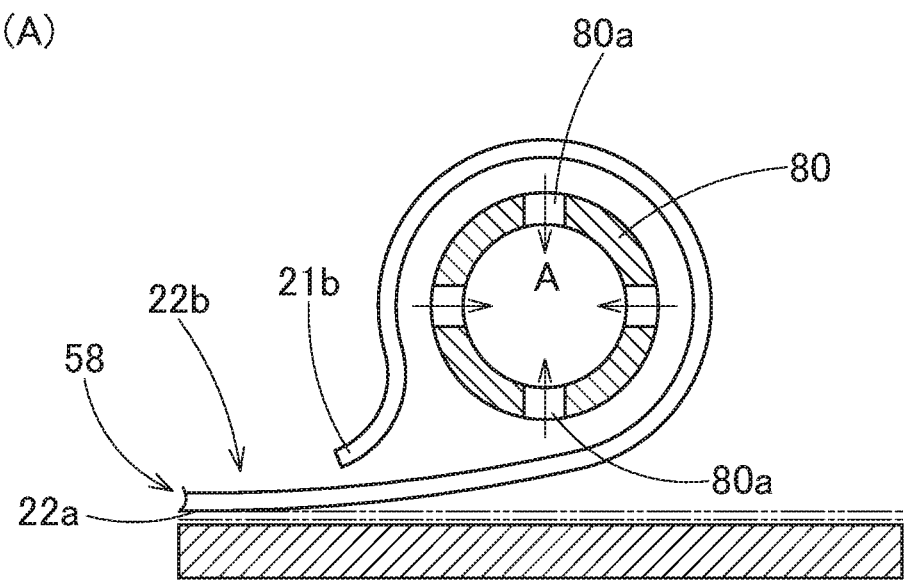
(B)
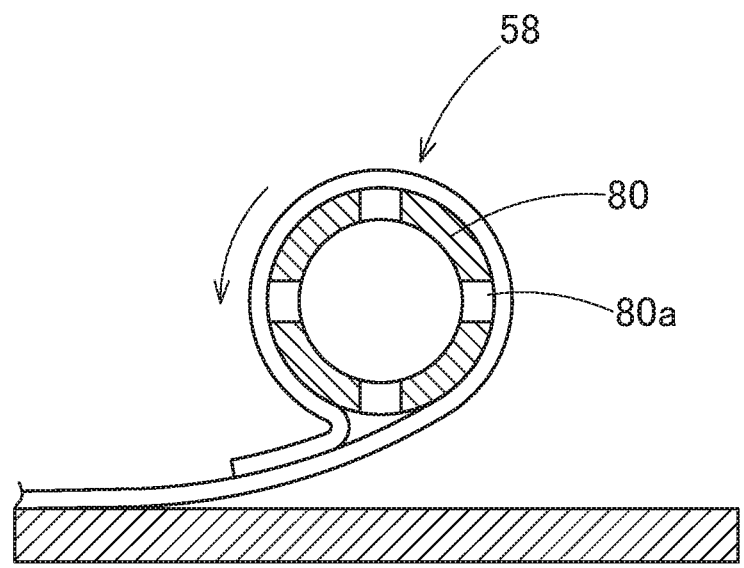

Fig. 5
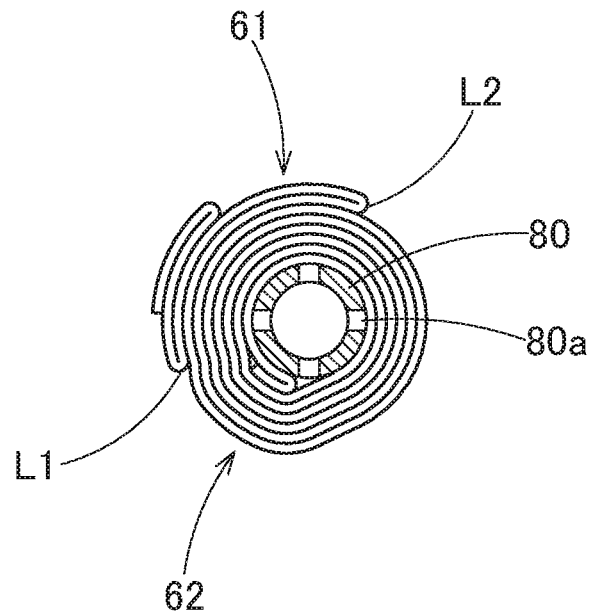
(A)
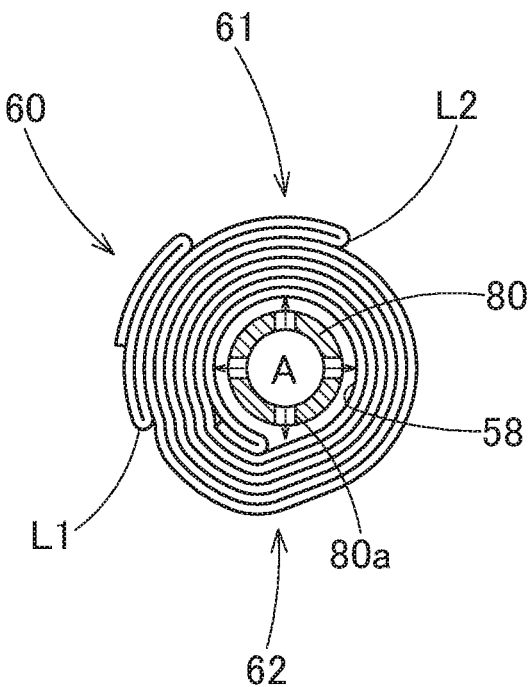
(B)

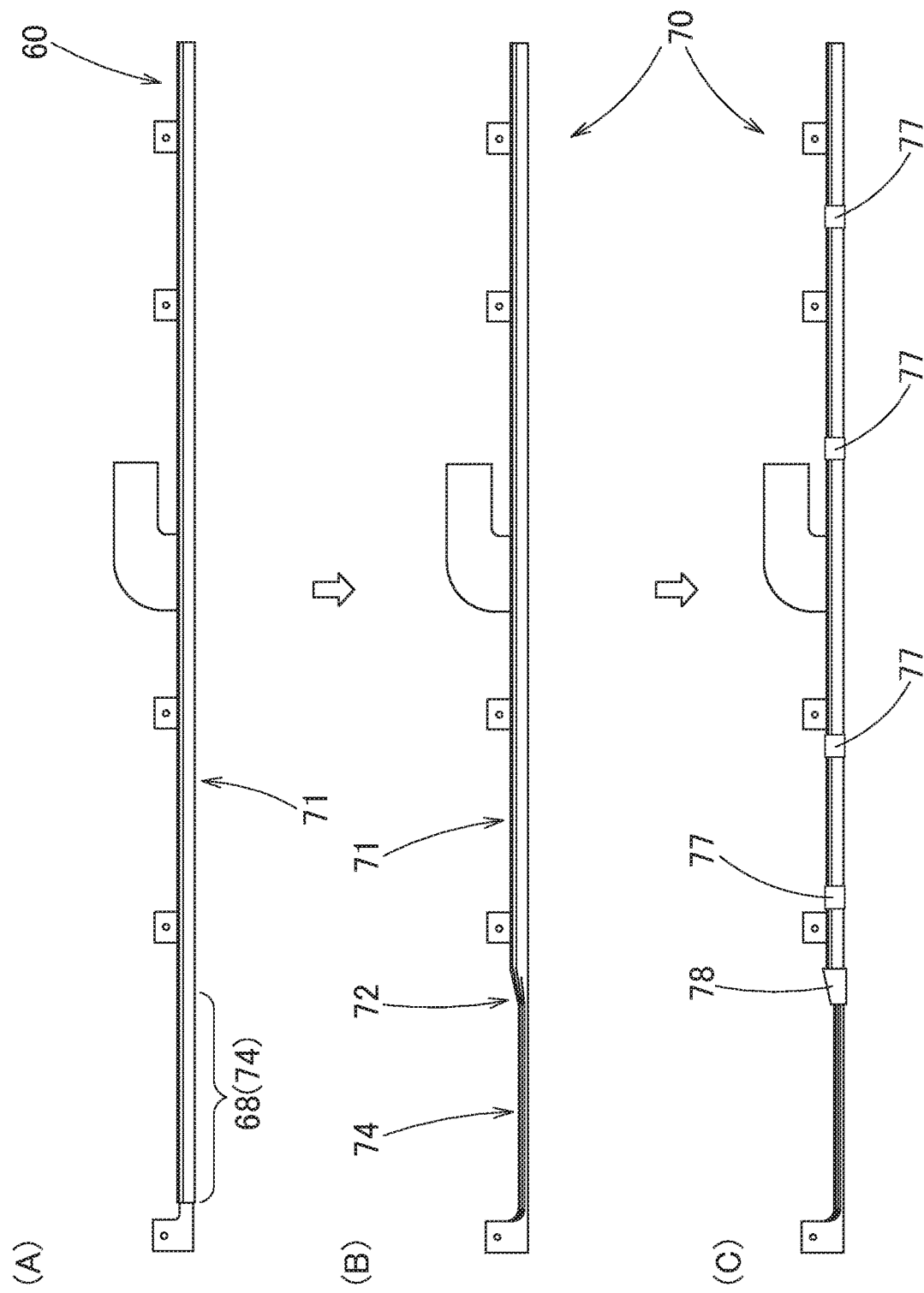

Fig. 9
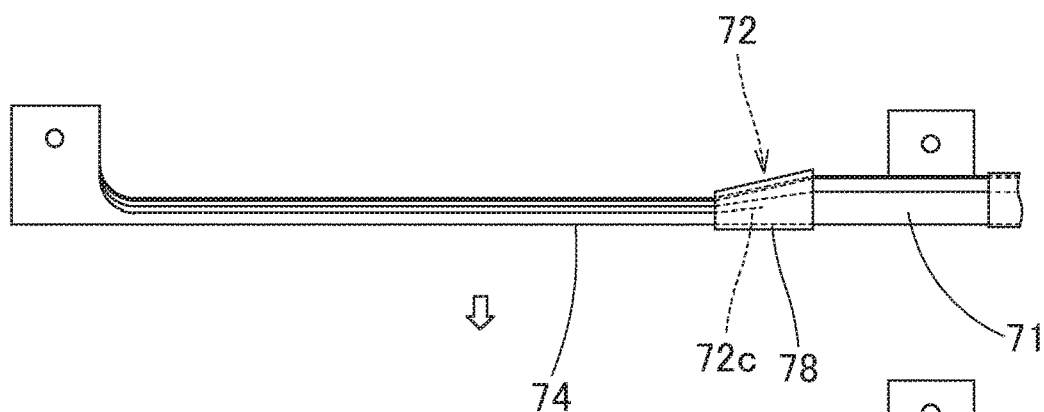
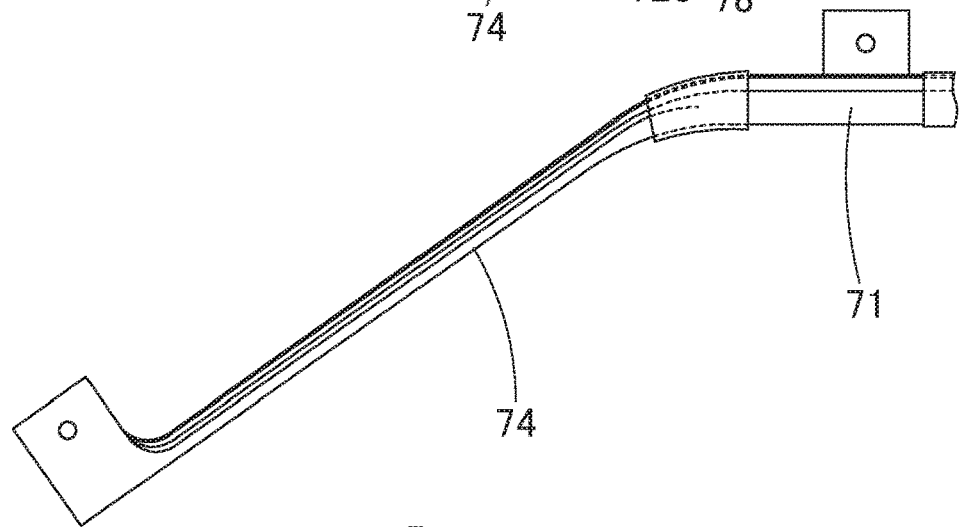
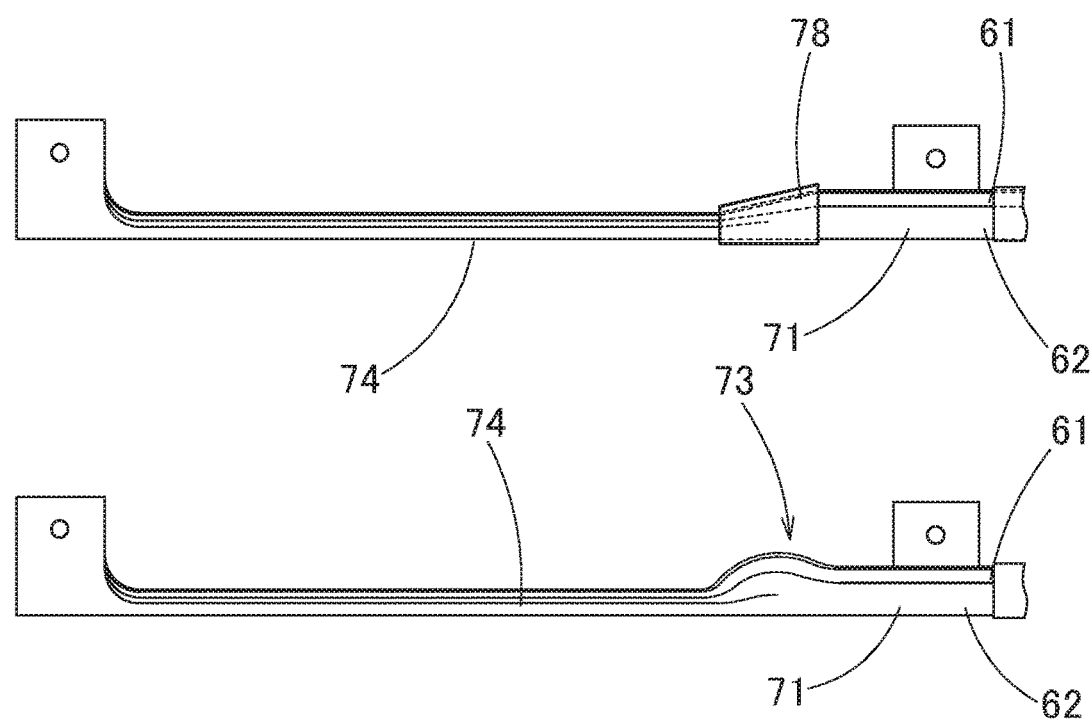

Fig. 11
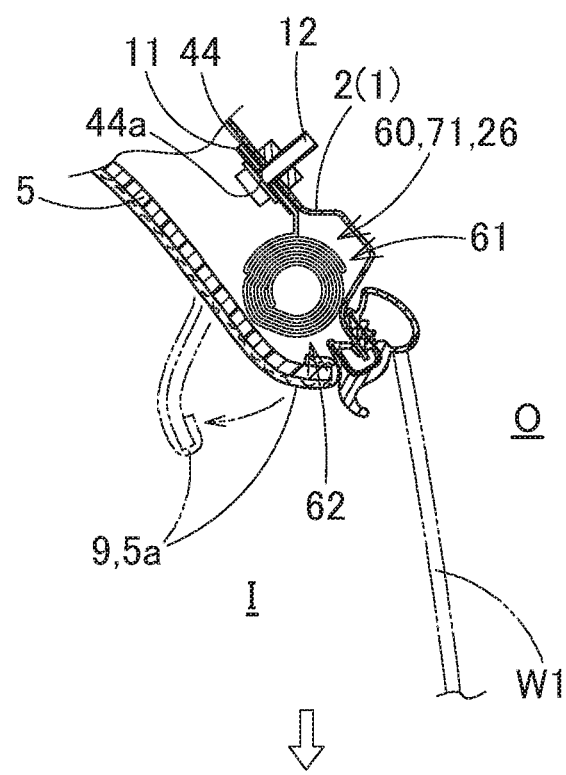
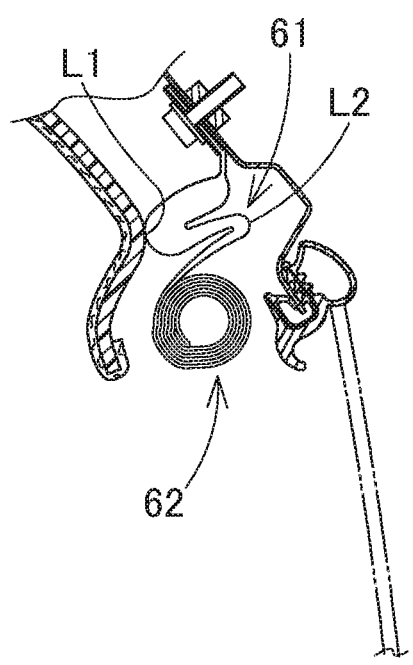
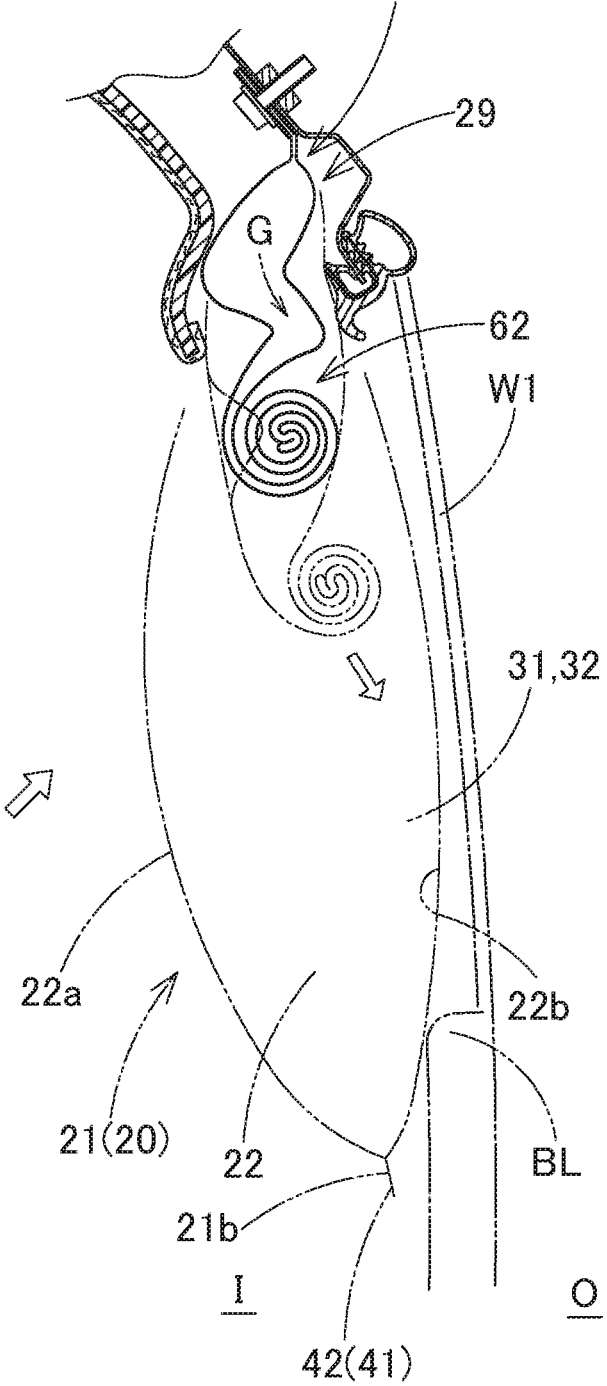

AIRBAG PACKAGE OF AN AIRBAG FOR HEAD PROTECTION

CROSS REFERENCE TO RELATED APPLICATIONS

The present application claims priority from Japanese Patent Application No. 2017-161668 of Hayashi et al., filed on Aug. 24, 2017, the entire disclosure of which is incorporated herein by reference.

BACKGROUND OF THE INVENTION

1. Field of the Invention

The present invention relates to an airbag package of an airbag for head protection that is inflatable with an inflation gas and deployable over a window of a vehicle at an inboard side of the window. More particularly, the invention relates to an airbag package formed by rolling and folding such an airbag for head protection in such a manner as to bring the lower edge of the airbag closer to the upper edge.

2. Description of Related Art

WO 2012/147490 A1 discloses a known airbag package of an airbag for use in an airbag device for head protection. In order to be installed in a limited space inside a front pillar, the airbag package is provided with a compressed region that is formed by compressing a void space formed at the center of a rolled portion of the airbag from above and below, as shown in FIG. 5A.

JP2013-514233 A discloses another known airbag package formed by pressing the airbag as preliminarily rolled, into a flat shape.

In the airbag package disclosed in the former reference, in order to form the compressed region, a predetermined salient jig is thrust against the rolled portion of the airbag, and removed thereafter. This leaves a void space in the airbag package after all, thus an improved way to form a compacter airbag package has been demanded.

In the airbag package disclosed in the latter reference, a void space formed at the center of the rolled portion is got rid of since the airbag as rolled is pressed into a flat shape. However, the pressing spreads out the airbag and increases the dimension of the airbag package. It has been a challenge to reduce the dimensions in four directions of a sectional shape of the airbag package.

SUMMARY OF THE INVENTION

The present invention contemplates a solution to the above-mentioned problem, and has an object to provide an airbag package of an airbag for head protection that includes a compressed region with a small cross-sectional dimension so as to be stored in a limited space of a vehicle smoothly.

An airbag package of the invention is of an airbag for head protection which is inflatable with an inflation gas for covering a window of a vehicle on an inner side of the window. The airbag package is formed by folding the airbag for storage in the upper periphery of the window.

The airbag package includes a rolled portion that is formed by rolling a skin material of the airbag from a lower edge towards an upper edge of the airbag as laid flat, and a compressed region in which a void space formed at the center of the cross-sectional surface of the rolled portion has been crushed due to compression. The rolled portion includes, in the cross-sectional surface, an upper layered portion, a lower layered portion, and a pair of side layered portions that are disposed around a center of the cross-sectional surface of the rolled portion and each have layers of the skin material of the airbag. The compressed region has such a cross-sectional shape that the upper layered portion, the lower layered portion and the pair of side layered portions have been brought close to the center of the cross-sectional surface of the rolled portion due to compression. In the compressed region, the pair of side layered portions are disposed between the upper layered portion and lower layered portion, and each of the side layered portions bends generally at the center in an up and down direction such that bent regions butt against each other and are packed between the upper layered portion and lower layered portion, thus filling the void space.

In the airbag package of the airbag for head protection of the invention, the compressed region has such a cross-sectional shape that the four sectorial portions of the rolled portion about the center of the cross-sectional surface, i.e. the upper layered portion, lower layered portion and left and right side layered portions, have been compressed and gathered towards the center, and further, each of the left and right side layered portions bends on the bent region and the bent regions butt against each other in such a state that are packed between the upper layered portion and lower layered portion. That is, the void space formed at the center of the rolled portion is constricted due to the gathering movement of the upper layered portion, lower layered portion and left and right side layered portions, and further disappears due to approximation of the bent regions of the side layered portions. Thus the compressed region has a small cross-sectional dimensions in both vertical and transverse directions.

Therefore, with the airbag package of the invention, the compressed region has a small cross-sectional dimension and can be smoothly stored in a limited storage area.

Moreover, the upper layered portion of the rolled portion, especially an outer portion of the upper layered portion, includes an initially inflatable region that takes in an inflation gas initially, unlike the side layered portions or lower layered portion. In the airbag package of the invention, the initially inflatable region has no dent region formed by compression work. Accordingly, the initially inflatable region will be smoothly inflated and smoothly push out the remainder of the rolled portion which stays rolled, thus steadying the deployment direction of the remainder of the rolled portion.

In the airbag package of an airbag for head protection of the invention, it is desired that:

the airbag as laid flat includes, above a region to form the rolled portion, an upper-reach region that is disposed in a farther upper reach of the inflation gas than the rolled portion; and the airbag package further includes, on the upper layered portion of the rolled portion in the compressed region, a concertina portion that is composed of the upper-reach region folded in a concertina-like fashion.

When the compressed region of the invention is fed with an inflation gas, the concertina portion unfolds first. The concertina portion is merely laid over the top surface of the upper layered portion of the rolled portion, and the top surface of the upper layered portion is a flat surface with no dents. With this configuration, the concertina portion will smoothly unfold and push the rolled portion out of the storage area, which will assist with smooth unrolling of the rolled portion that follows.

The compressed region is desirably disposed at a vicinity of the front end of the airbag package for storage inside a front pillar of the vehicle which forms a front rim of the window. Although the front pillar generally has a limited storage area inside, the compressed region of the invention with a small cross-sectional dimension will fit the storage area inside the front pillar smoothly.

In the above instance, it is desired that a non-compressed region is disposed at the rear of the compressed region for deployment over the window disposed at the rear of the front pillar. Since the non-compressed region requires less time for unfolding than the compressed region, the non-compressed region will quickly unfold and cover the window at airbag deployment.

In this instance, moreover, it is desired that the airbag package includes: a boundary region of the compressed region and the non-compressed region which enlarges in diameter from the compressed region with a small cross-sectional surface towards the non-compressed region with a greater cross-sectional surface; and a covering member that is wound around the boundary region and is breakable at airbag deployment.

The airbag package is bent on the boundary region when transported, and straightened again when mounted on board. Without the covering member mounted around the boundary region, it would be likely that the bent region, in which the skin material of the airbag piles upon itself, is not restored to the original configuration due to frictional resistance or the like, but forms a bulge, which would render the airbag package unsuitable for mounting on the vehicle. However, the covering member will prevent the bent region from bulging and help keep the bent region in the original configuration even after straightening after bending. Therefore, the airbag package will be mounted on the vehicle smoothly.

The cross-sectional shape of the compressed region may be formed into a generally quadrilateral with rounded four corners, or a generally circle.

The method of production of an airbag package of the invention is a method of production of an airbag package of an airbag for head protection that is inflatable with an inflation gas for covering a window of a vehicle on an inner side of the window and folded up and compressed to be stored in the upper periphery of the window.

The method of production includes steps of rolling and compressing.

In the rolling step, a skin material of the airbag is rolled from the lower edge towards the upper edge of the airbag as laid flat, thereby forming a folded body. The folded body includes a rolled portion and a void space disposed at the center of a cross-sectional surface of the rolled portion. The rolled portion includes, around the center of the cross-sectional surface, an upper layered portion, a lower layered portion, and a pair of side layered portions each of which has layers of the skin material.

For the compressing step, a cavity that includes a bottom plane and a pair of side planes is prepared. An opening width of the cavity is smaller than an outside dimension of the folded body of the airbag. The folded body of the airbag is pushed into the cavity such that the rolled portion is brought into contact with the bottom plane and side planes of the cavity. Then the folded body is compressed towards the bottom plane of the cavity such that each of the side layered portions bends generally at the center in an up and down direction between the upper layered portion and the lower layered portion, and bent regions of the side layered portions butt against each other and eliminate the void space of the rolled portion.

This production method provides the airbag package with such a compressed region that includes the bent regions of the side layered portions abutting against each other and has no dent region on the upper layered portion of the rolled portion, merely by pushing the folded body of the airbag into the cavity with the opening width smaller than the outside dimension of the folded body and compressing the rolled portion towards the bottom plane of the cavity.

In the above method of production of an airbag package, it is desired that:

the airbag for head protection as laid flat includes, above a region to form the rolled portion, an upper-reach region that is disposed in a farther upper reach of the inflation gas than the rolled portion; and the method further includes:

folding the upper-reach region in a concertina-like fashion on one or more folds to form a concertina portion;

placing the concertina portion on the upper layered portion of the rolled portion to finish the folded body; and when pushing the folded body into the cavity before the compressing, making the folds of the concertina portion face towards the rolled portion.

With this method, the folds of the concertina portion will be kept fitly disposed on the rolled portion, such that the folds will be smoothly unfolded and push out the rolled portion at deployment of the compressed region.

BRIEF DESCRIPTION OF DRAWINGS

FIG. 4 schematically illustrates the way the airbag of FIG. 2 is rolled with the aid of a roll core;

FIG. 5 schematically illustrates the way the roll core is removed from the rolled airbag;

FIG. 7 illustrates a process of mounting a shape-keeping member and a covering member on the airbag package;

FIG. 9 illustrates the way the airbag package is bent, then restored, and also illustrates an instance where the airbag package is not provided with a covering member;

FIG. 11 illustrates the deployment behavior of the airbag package of the embodiment as mounted on the vehicle in schematic sectional views, especially showing a primary deployment area (i.e. non-compressed region) of the airbag package;

DESCRIPTION OF PREFERRED EMBODIMENTS

Preferred embodiments of the present invention are described below with reference to the accompanying drawings. However, the invention is not limited to the embodiments disclosed herein. All modifications within the appended claims and equivalents relative thereto are intended to be encompassed in the scope of the claims.

Figure 1:
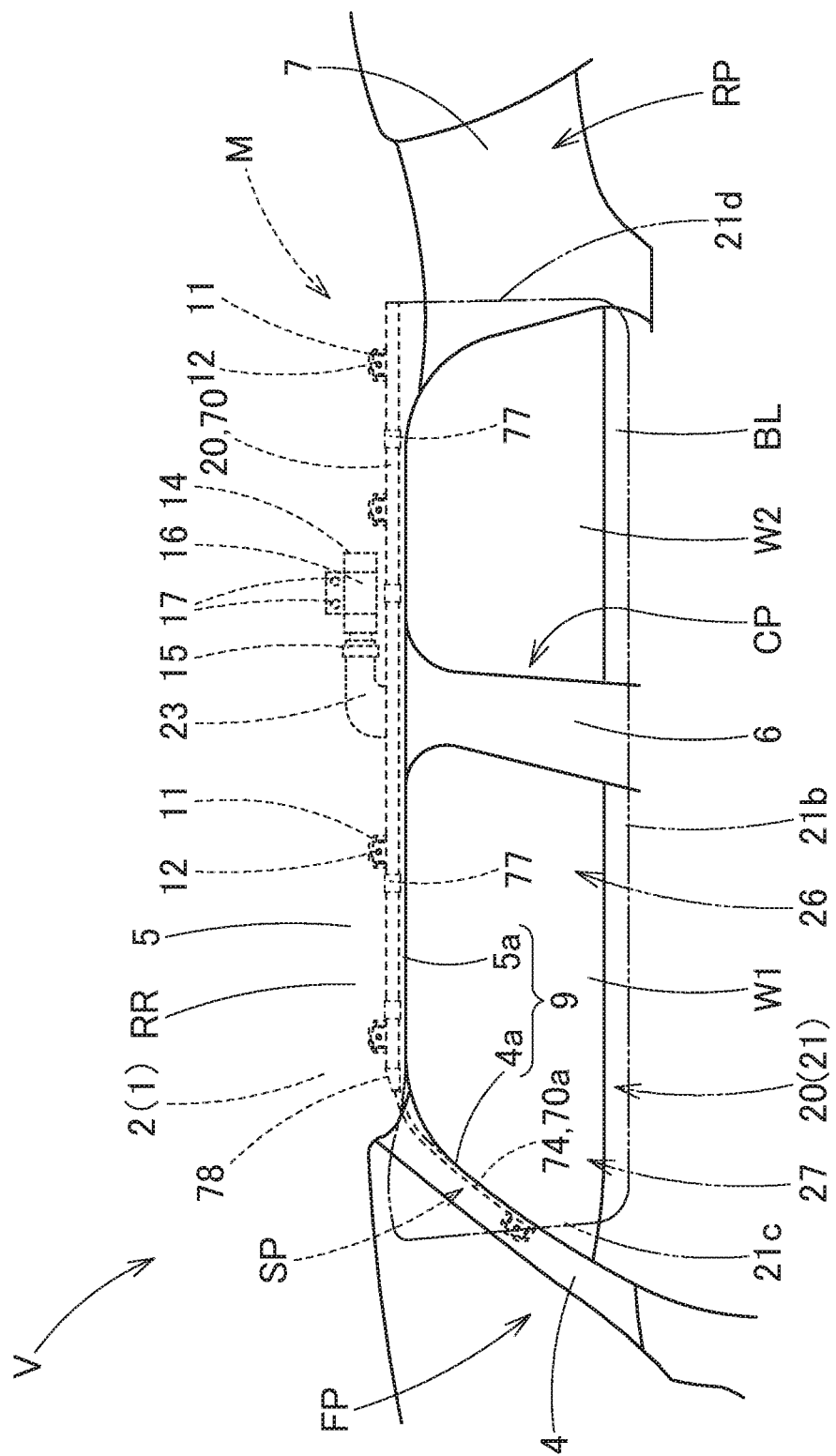
FIG. 1 is a schematic front elevation of an airbag device for head protection which employs an airbag package embodying the invention, as the device is viewed from an interior of a vehicle.

An airbag package 70 of an airbag 80 for head protection embodying the invention is for use in an airbag device M for head protection shown in FIG. 1. As shown in FIG. 1, the airbag device M includes an airbag 20, an inflator 14, a mounting bracket 11, a mounting bracket 16 and an airbag cover 9. The airbag 20 is adapted to be stored in the upper peripheries of windows W1 and W2 inside a vehicle V in the form of the airbag package 70. Specifically, the airbag 20 is disposed at an area ranging from the lower rim 4a of a front pillar FP through a region above a rear pillar RP, via a lower rim 5e of a roof side rail RR, as shown in FIG. 1. In the illustrated embodiment, the airbag 20 is designed to protect the head of a vehicle occupant in the event of a side impact or a rollover of the vehicle V. The windows W1 and W2 are each disposed at a side of the front seat and rear seat.

Figure 12:
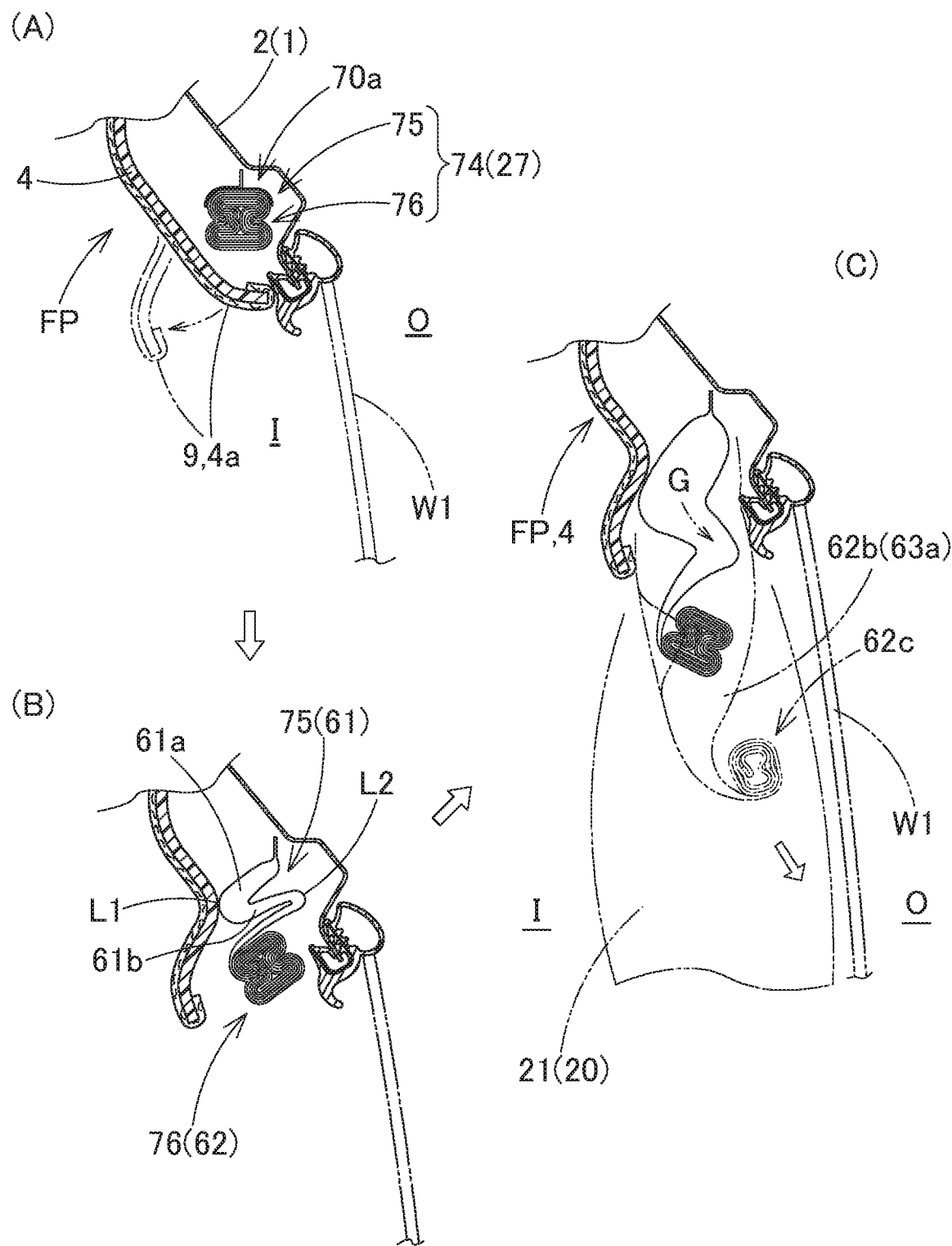
FIG. 12 illustrates the deployment behavior of the airbag package of the embodiment as mounted on the vehicle in schematic sectional views, especially showing a secondary deployment area (i.e. compressed region) of the airbag package.

The airbag cover 9 is composed of the lower rim 4a of a front pillar garnish 4 arranged on the front pillar FP and the lower rim 5a of a roof head liner 5 arranged on the roof side rail RR. Each of the front pillar garnish 4 and roof head liner 5 is fabricated of synthetic resin, and secured to an inboard side of an inner panel 2, a part of a vehicle body structure 1. As shown in FIGS. 11 and 12, the airbag cover 9 covers an inboard side of the airbag 20 stored in a folded-up configuration, i.e. the airbag package 70, and is configured to open towards an interior I of the vehicle V when pushed by the airbag 20 as actuated.

As shown in FIG. 1, the inflator 14 feeds the airbag 20 with an inflation gas. The inflator 14 is substantially cylindrical in outer contour and includes not-shown gas discharge ports at the leading end region. The leading end region of the inflator 14 including the gas discharge ports is inserted into a later-described inlet port section 23 of the airbag 20, and a clamp 15 is used to fasten the inlet port section 23 and inflator 14, thus the inflator 14 is coupled with the airbag 20. The mounting bracket 16 holds the inflator 14. Held by the mounting bracket 16, the inflator 14 is secured to the inner panel 2 at a position above the window W2 through the use of bolts 17 which fasten the mounting bracket 16 to the inner panel 2, as shown in FIG. 1. The inflator 14 is electrically connected to a not-shown control device of the vehicle V through a not-shown lead wire, and is designed to be actuated by an actuating signal fed from the control device as has detected a side impact or a rollover of the vehicle V.

Figure 2:
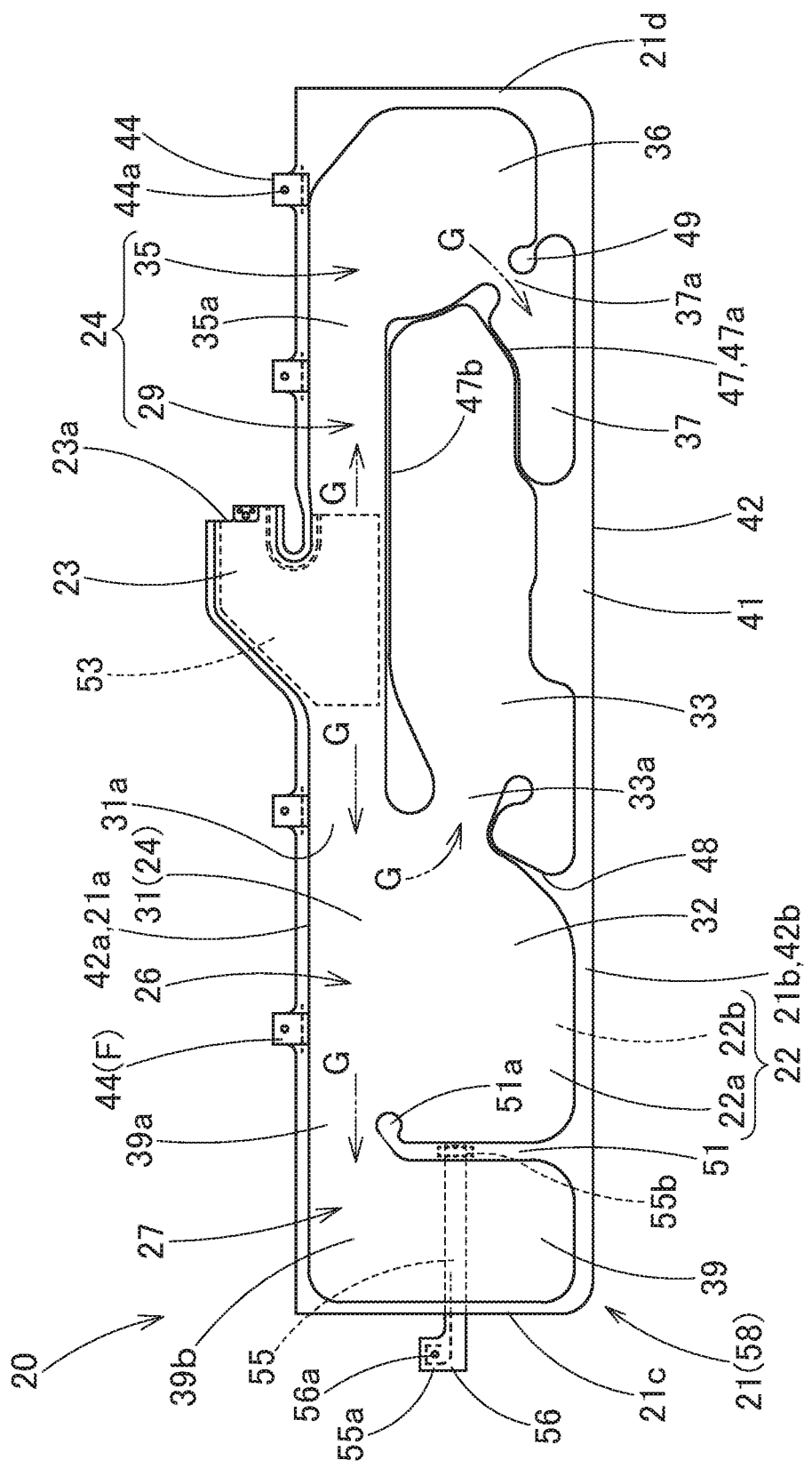
FIG. 2 is a front elevation of an airbag for head protection forming the airbag package of the embodiment as unfolded.

Each of the mounting brackets 11 is composed of a pair of plates of sheet metal. Each of the mounting brackets 11 is mounted on each of later-described mounting regions 44 and 56 of the airbag 20 on both sides, and is used to mount the mounting regions 44 and 56 on the inner panel 2 of the vehicle body structure 1 with the aid of bolts 12, as shown in FIGS. 1, 2 and 11.

Figure 10:
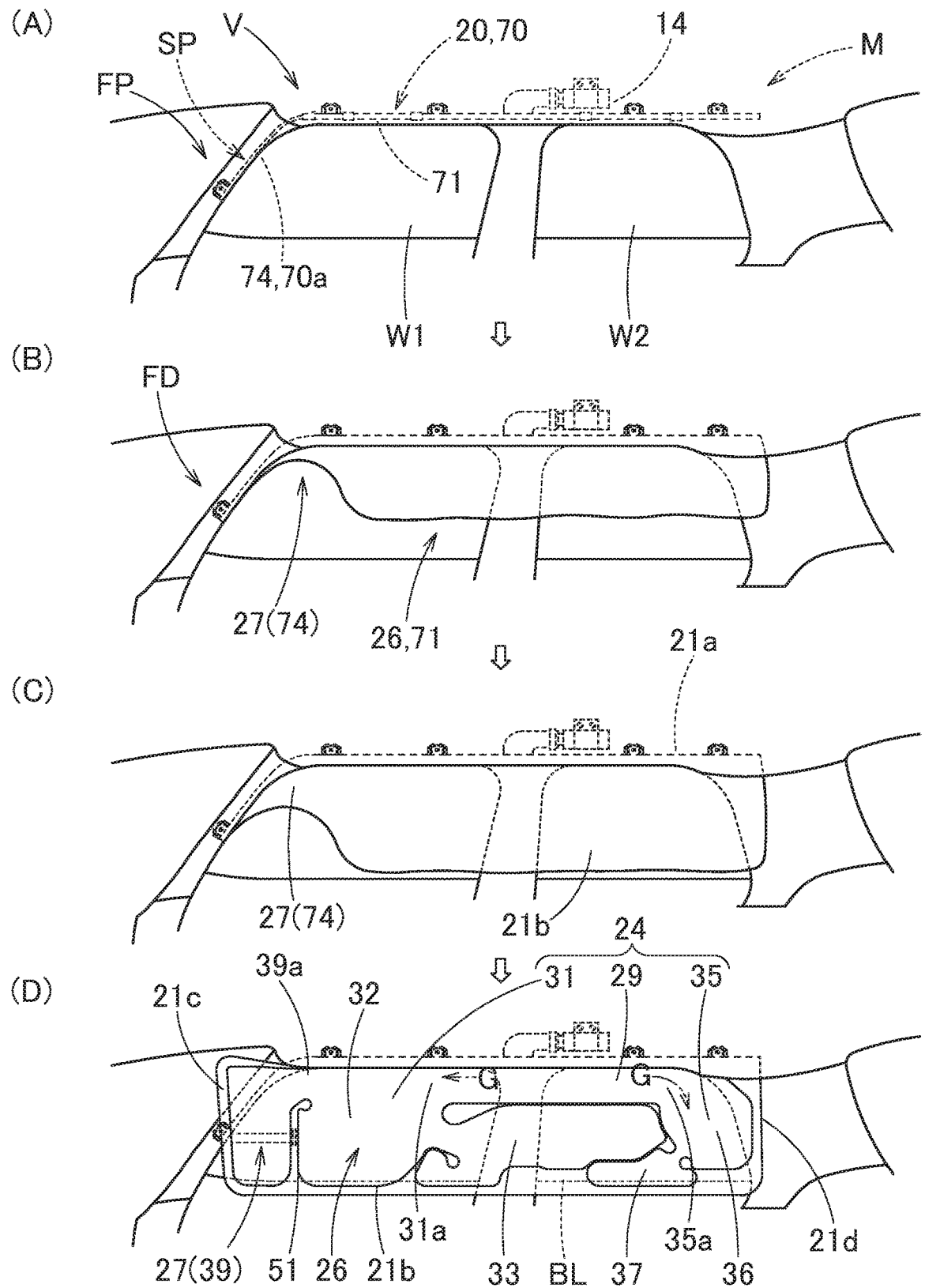
FIG. 10 illustrates a deployment behavior of the airbag package of the embodiment as mounted on the vehicle in schematic front elevations viewed from an interior of the vehicle.

As shown in FIGS. 1 (double-dotted lines), 2 and 10, the airbag 20 is inflatable with an inflation gas fed from the inflator 14, and when unfolded and inflated, covers inboard sides of the windows W1 and W2 and pillar garnishes 6 and 7 of the center pillar CP and the rear pillar RP. Specifically, the airbag 20 as deployed has such a generally rectangular board shape elongated in a front and rear direction that is capable of covering an inboard side of an area extending across the window W1, center pillar CP, window W2 and a front region of the rear pillar RP. Moreover, as shown in FIGS. 1 and 10, the airbag 20 of the illustrated embodiment is configured such that the lower edge 21b as deployed is positioned below the belt line BL which is composed of lower rims of the windows W1 and W2. As shown in FIG. 2, in the illustrated embodiment, the airbag 20 includes a bag body 21, an inner tube 53 disposed inside the inlet port section 23 of the bag body 21, and a connecting member 55 disposed at a vicinity of the front end 21c of the bag body 21.

The bag body 21 of the illustrated embodiment is composed of a skin material 58 which has a hollow-weave or one-piece woven structure of polyamide yarn, polyester yarn or the like, and includes an inboard side wall 22a deployable on an inboard side I and an outboard side wall 22b deployable on an outboard side O. The bag body 21 includes a gas receivable region 22 (FIG. 11) that is inflatable with an inflation gas G by separating the inboard side wall 22a and outboard side wall 22b, and a non-receptive region (seam) 41 that receives no inflation gas.

The gas receivable region 22 includes a shielding region 24 deployable over the windows W1 and W2 and a tubular inlet port section 23 to be coupled with the inflator 14 in order to deliver an inflation gas to the shielding region 24. The inlet port section 23 is disposed at a vicinity of the center in a front and rear direction of the upper edge 21a of the bag body 21, and internally includes the inner tube 53 for enhancing heat resistance. The inlet port section 23 includes an opening 23a at the rear end, and the inflator 14 is inserted therefrom. The inflator 14 and the inlet port section 23 are coupled together with a clamp 15.

The shielding region 24 includes a plurality of (two, in the illustrated embodiment) main inflatable regions, i.e. a main inflatable region 31 and a main inflatable region 35, which are disposed one behind another, and a gas feed path 29 disposed along the upper edge of the shielding region 24, above the main inflatable regions 31 and 35. The gas feed path 29 is in gas communication with the inlet port section 23 and delivers the inflation gas G as come over from the inlet port section 23 to the front and rear main inflatable regions 31 and 35.

The front main inflatable region 31 includes a front protection region 32 deployable over the window W1 at a side of the head of a vehicle occupant sitting in the front seat and an auxiliary inflatable region 33 inflatable at the rear of the front protection region 32. The front protection region 32 is designed to take in an inflation gas G via a supply port 31a disposed at the front end of the gas feed path 29. The auxiliary inflatable region 33 is in communication with the front protection region 32 via a communication port 33a disposed at the front end, thus inflatable with an inflation gas G from the front protection region 32 via the communication port 33a.

The rear main inflatable region 35 includes a rear protection region 36 deployable over the window W2 at a side of the head of a vehicle occupant sitting in the rear seat and an auxiliary inflatable region 37 inflatable in front of and below the rear protection region 36. The rear protection region 35 is designed to take in an inflation gas G via a supply port 35a disposed at the rear end of the gas feed path 29. The auxiliary inflatable region 37 is in communication with the rear protection region 36 via a communication port 37a disposed at the rear end, thus inflatable with an inflation gas G from the rear protection region 36 via the communication port 37a.

The auxiliary inflatable regions 33 and 37 each serve as a pressure regulating chamber for the front protection region 32 and rear protection region 36. Each of the auxiliary inflatable regions 33 and 37 takes in an inflation gas G from the front protection region 32/rear protection region 36 as has caught the occupant's head, and prevents a sudden elevation of internal pressure in the front protection region 32/rear protection region 36.

In a vicinity of the front end of the shielding region 24, there is disposed a terminal inflatable region 39 partitioned from the front protection region 32 by a later-described partitioning region (specifically, terminal partitioning region) 51. The terminal inflatable region 39 includes an inlet port 39a at the upper region, between an upper end 51a of the partitioning region 51 and an upper edge 42a of a later-described peripheral region 42. The terminal inflatable region 39 takes in an inflation gas G from the front protection region 32 of the main inflatable region 31 via the inlet port 39a, and inflates. The terminal inflatable region 39 is provided to catch and protect the head of a front seat occupant as he moves obliquely forward and outwardly in the event of an offset collision or the like of the vehicle V.

In the illustrated embodiment, the gas feed path 29 and main inflatable regions 31 and 35 belong to a primary deployment area 26 which covers the windows W1 and W2 quickly with a steady deployment behavior. The terminal inflatable region 39, which is designed to catch and protect the occupant's head as has moved over from the sitting position, serves as a secondary deployment area 27 since it has only to unfold and inflate later, in other words, it is designed to catch the occupant after a certain time has passed after the start of inflation of the airbag.

The non-receptive region 41 includes a peripheral region 42 which defines the outer periphery of the gas receivable region 22, mounting regions 44 and partitioning regions 47, 48, 49 and 51 each of which is disposed within an area of the gas receivable region 22 to partition one inflatable region from another.

The peripheral region 42 is so disposed as to surround the gas receivable region 22 all over except the opening 23a of the inlet port section 23. The mounting regions 44 are provided in plurality along a front and rear direction of the bag body 21 to mount the upper edge 21a of the bag body 21 on the inner panel 2. Each of the mounting regions 44 is composed of a cloth member (fabric) separate from the one-piece woven skin material 58 of the airbag, and attached to an upper edge 42a of the peripheral region 42 in the upper edge 21a of the bag body 21 in such a manner as to protrude upward from the upper edge 21a of the bag body 21. Four mounting regions 44 in total are employed in the illustrated embodiment. Two of them are disposed in front of the inlet port section 23 while the rest at the rear of the inlet port section 23. Each of the mounting regions 44 is provided with a mounting hole 44a for receiving the mounting bolt 12.

The partitioning region 47 constitutes a central partitioning region 47 which includes a vertical rod region 47a extending upward in a curving fashion from a vicinity of the center in a front and rear direction of a lower portion 42b of the peripheral region 42, and a horizontal rod region 47b extending forward from the upper end of the vertical rod region 47a. The vertical rod region 47a partitions the auxiliary inflatable region 33 of the main inflatable region 31 from the rear main inflatable region 35 (i.e. the auxiliary inflatable region 37 and rear protection region 36). The horizontal rod region 47b partitions the gas feed path 29 from the auxiliary inflatable region 33, and defines the lower edge of the gas feed path 29.

The partitioning region 48 defines the lower edge of the communication port 33a of the auxiliary inflatable region 33, and constitutes a front lower partitioning region 48 which extends upward from the lower portion 42b of the peripheral region 42 and partitions the front protection region 32 from the auxiliary inflatable region 33. The partitioning region 49 defines the lower edge of the communication port 37a of the auxiliary inflatable region 37, and constitutes a rear lower partitioning region 49 which extends upward from the lower portion 42b of the peripheral region 42 and partitions the auxiliary inflatable region 37 from the rear protection region 36.

The partitioning region 51 constitutes a terminal partitioning region 51 which partitions the terminal inflatable region 39 from the front protection region 32. The partitioning region 51 extends upward from a front portion of the lower portion 42b of the peripheral region 42. The upper end 51a of the partitioning region 51 is so formed as not to reach the upper portion 42a of the peripheral region 42, thus providing the inlet port 39a of the terminal inflatable region 39 between itself and the upper portion 42a of the peripheral region 42.

The connecting member 55 is composed of a flexible sheet material provided separate from the bag body 21. In the illustrated embodiment, the connecting member 55 is formed of a woven fabric of polyester yarn, polyamide yarn or the like. The root region 55b of the connecting member 55 is joined to the bag body 21 while the leading end region 55a is adapted to be mounted on the vehicle body structure 1 at a periphery of the window W1 apart from the front end 21c of the bag body 21. In the illustrated embodiment, the leading end region 55a of the connecting member 55 is secured to the inner panel 2 (i.e. vehicle body structure 1) at the front pillar FP. In the illustrated embodiment, the root region 55a of the connecting member 55 is sewn to an outboard side of the terminal partitioning region 51 with a sewing thread such that the connecting member 55 is disposed on an outboard side of the terminal inflatable region 39 at airbag deployment. The connecting member 55 includes, at the leading end 55a, a mounting region 56. The mounting region 56 is adapted to be mounted on the inner panel 2 with the aid of the mounting bracket 11 and mounting bolt 12 in a similar fashion to the mounting regions 44. The mounting region 56 is provided with a mounting hole 56a for receiving the mounting bolt 12.

The airbag 20 is folded up into the airbag package 70 which includes a compressed region 74 and a non-compressed region 71, as shown in FIG. 7. In the illustrated embodiment, an area around the terminal inflatable region 39 disposed in the front end region 21c of the bag body 21 including the connecting member 55 and inlet port 39a (i.e. the secondary deployment area 27) forms the compressed region 74, and the remaining area including the gas feed path 29 and main inflatable regions 31 and 35 forms the non-compressed region 71. The compressed region 74 is adapted to be stowed away in a limited space beneath the front pillar garnish 4 of the front pillar FP, as shown in FIG. 1.

Figure 3:
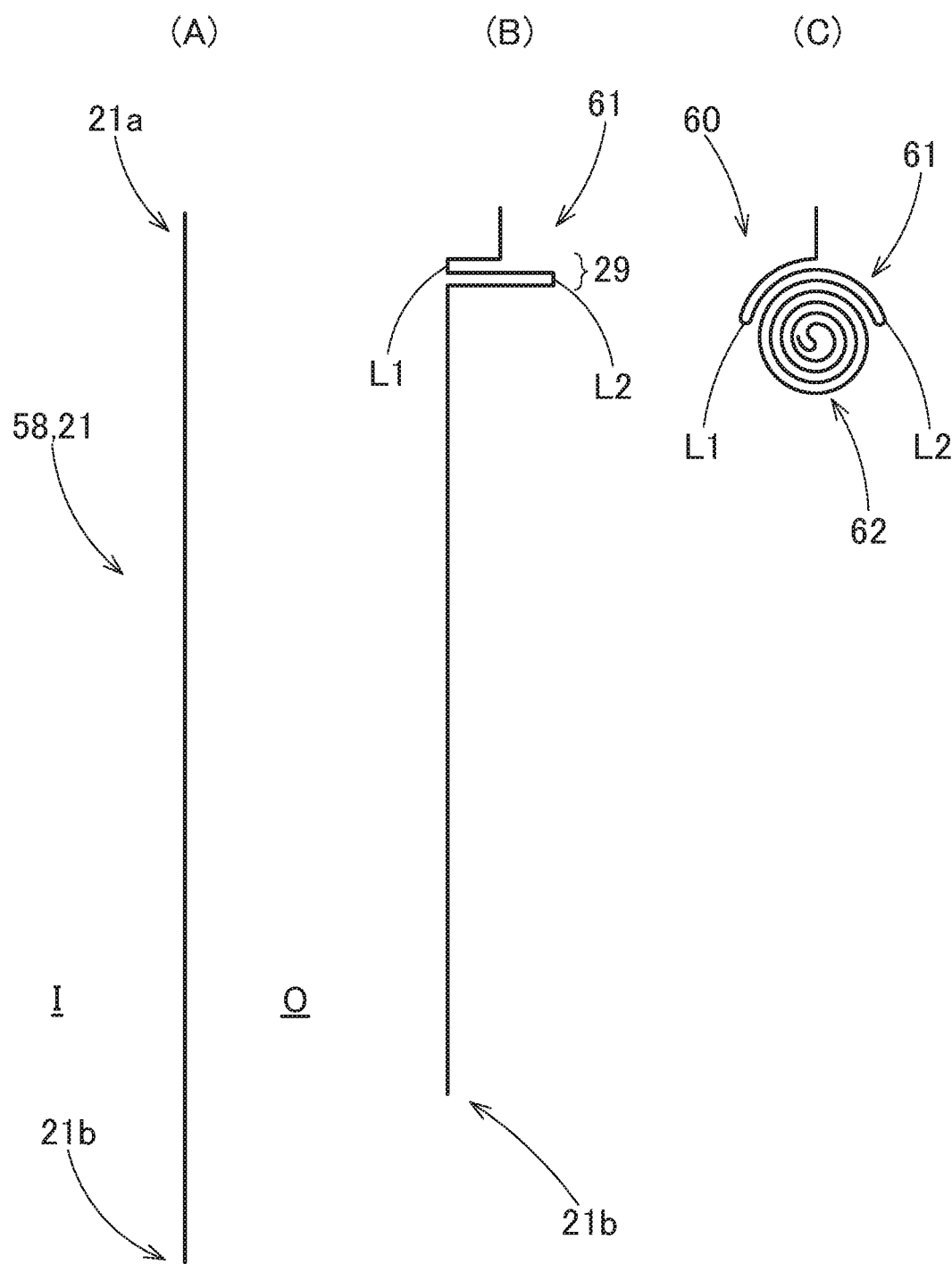
FIG. 3 schematically illustrates a folding process of the airbag of FIG. 2.

The process of forming the airbag package 70 by folding up the airbag 20 and forming the compressed region 74 is now described. The folding process of the airbag 20 is described first. Generally, the bag body 21 (i.e. skin material 58) is so laid that the inboard side wall 22a and outboard side wall 22b lie flat over each other, then folded up such that the dimension in an up and down direction is reduced (in such a manner as to bring the lower edge 21a close to the upper edge 21b), thus providing a folded body 60 which includes a concertina portion 61 and a rolled portion 62. More specifically, in the illustrated embodiment, as shown in (A) and (B) of FIG. 3, the gas feed path 29 in the upper edge 21a of the bag body 21 is folded in a concertina-like fashion on two creases (or folds) L1 and L2 extending generally in a front and rear direction. Then as shown in (B) and (C) of FIG. 3, an area below the gas feed path 29 is rolled towards the outboard side O from the lower edge 21b. To describe more specifically, the bag body 21 is laid flat on a working surface of a not-shown folding machine, and the area of the gas feed path 29 is folded in a concertina-like fashion on the creases L1 and L2 with the aid of a not-shown folding plate. Here, the concertina portion 61 is formed. Generally simultaneously, the rolling is conducted. In the illustrated embodiment, a roll core 80 shown in FIG. 4 is used for the rolling. The roll core 80 is an elongated circular hollow cylinder provided with numerous air suction ports 80a. As shown in (A) and (B) of FIG. 4, the roll core 80 is placed in a vicinity of the lower edge 21b of the bag body 21 on the outboard side wall 22b, and rotated to roll up the bag body 21 as shown in (A) of FIG. 5. Through the rolling, an air A is suctioned from the air suction ports 80a such that the skin material 58 of the bag body 21 is adsorbed onto the outer circumference of the roll core 80. Then as shown in (B) of FIG. 5, an air A is exhausted from the air suction ports 80a to form a small gap between the roll core 80 and bag body 21 (skin material 58) so as to enable a removal of the roll core 80. Thus the rolled portion 62 is formed below the concertina portion 61, and the folded body 60 is formed. As shown in (A) of FIG. 6, the rolled portion 62 is provided with a void space H equivalent in volume to the roll core 80, at the center.

As described above, an area of the terminal inflatable region 39 in the folded body 60 is the area 68 to be subjected to compression, as shown in (A) of FIG. 7. Heating and pressing are applied to the area 68 through the use of a heating press 85 shown in FIG. 6. Firstly, as can be seen in (A) and (B) of FIG. 6, the area 68 of the folded body 60 is pushed into a cavity 87 of a fixed mold 86 of the heating press 85. A dimension B1 between the side planes 89 and 90 of the cavity 87 of the fixed mold 86 is smaller than an outside dimension (i.e. width) D1 in a left and right direction of the folded body 60 as the folds L1 and L2 of the concertina portion 61 are kept facing towards the rolled portion 62 (as the concertina portion 61 is not bent such that the folds L1 and L2 face upward). Thus, the void space H in the folded body 60 as pushed into the cavity 87 is a little crushed in a left and right direction. Further, the folded body 60 is pushed into the cavity 87 such that the rolled portion 62 is brought into contact with the side planes 89 and 90 and bottom plane 88 of the mold 86 while the concertina portion 61 is disposed apart from the bottom plane 88, i.e. at a vicinity of the opening 87a of the cavity 87.

Subsequently, as can be seen in (B) and (C) of FIG. 6, a movable mold 92 is put into the cavity 87 to press a press plate 93 of the movable mold 92 against the concertina portion 61 of the folded body 60, and held down towards the bottom plane 88. Thus the folded body 60 is compressed, and then heated through the use of a not-shown heater for a predetermined time period, and the compressed region 74 is formed. Since the area 68 of the folded body 60 is pressed by the press plate 93 while constrained by the side planes 89 and 90, the concertina portion 61, an upper layered portion 63 and a lower layered portion 64 of the rolled portion 62, where the skin material 58 lie over one another, extend generally in parallel to the press plate 93 or bottom plane 88. In the meantime, side layered portions 65 and 66, which are portions of the rolled portion 62 in a left and right direction (width direction), bend towards the void space H (towards each other) on bent regions 65a and 66a and crush the void space H. Thus the compressed region 74 is easily formed.

In the compressed region 74, the left and right side layered portions 65 and 66 of the rolled portion 60 each bend generally at the center in an up and down direction such that the bent regions 65a and 66a come close to each other, while packed between the upper and lower layered portions 63 and 64, such that the void space H is eliminated. Accordingly, the cross-sectional dimension in a direction perpendicular to the axial direction of the compressed region 74 is smaller than that before being subjected to heating and pressing. In the illustrated embodiment, an outside dimension of a cross-sectional surface of the compressed region 74 is approximately 70 to 80 percent of that of the area 68 of the folded body 60 before compression, both in an up and down direction and left and right direction. Upon heating and pressing, the skin material 58 (the inboard-side wall 22a and outboard-side wall 22b) of the bag body 21 itself is compressed as well, thus the skin material 58 in the compressed region 74 has a reduced thickness in comparison with the skin material 58 of the non-compressed region 71 of the airbag package 70 which has not been subjected to compression. The heating press 58 is designed to heat and press the folded body 60 approximately at 100° C. and with a predetermined pressing force.

Thereafter, the compressed region 74 is cooled down through the use of not-shown cooling press in order to prevent a decompression of the skin material 58. The airbag package 70 is thus completed.

Figure 8A:
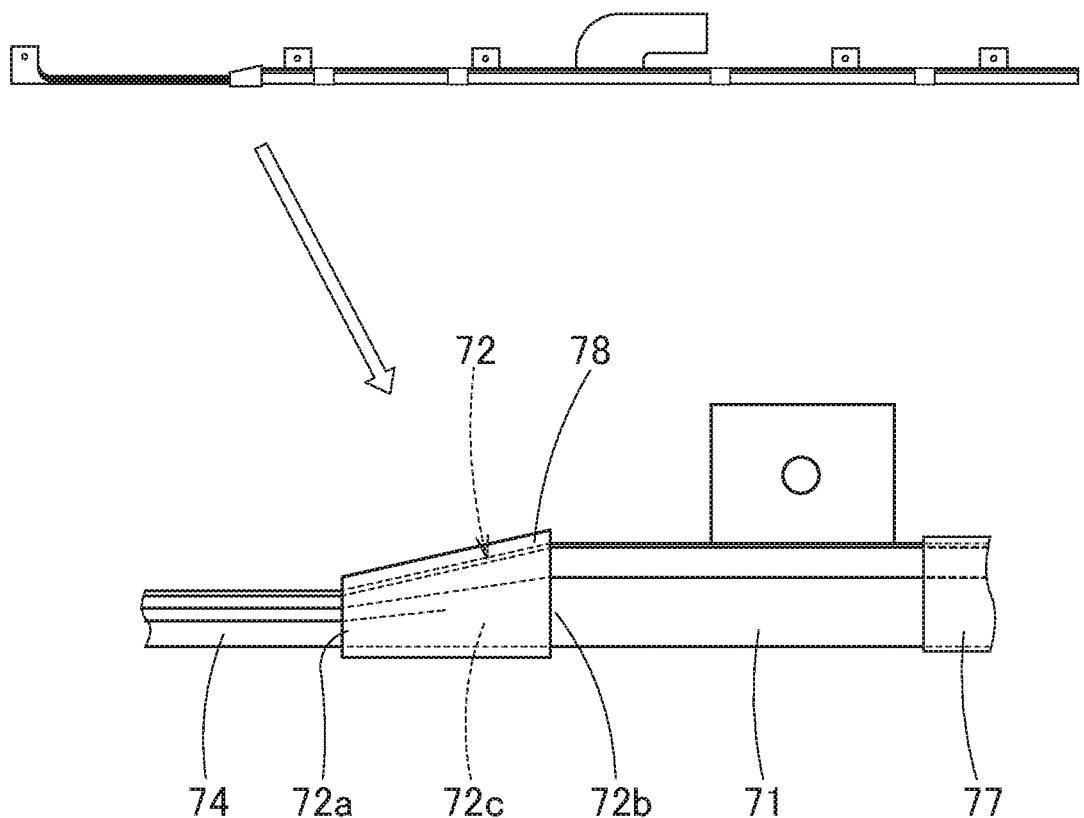
FIG. 8A is an enlarged front elevation of a portion of the airbag package on which the covering member is mounted.

Thereafter, as shown in (B) and (C) of FIG. 7, a covering member 78 and a plurality of shape-keeping members 77, each of which is composed of a breakable tape and provided with an adhesive on the back surface, are wound around the airbag package 70 at predetermined positions. The shape-keeping members 77 are mounted at more than one positions while the covering member 78 is mounted on a portion in a vicinity of the boundary region 72 of the compressed region 74 and non-compressed region 71. As shown in FIG. 8A, the boundary region 72 is an area which enlarges in diameter from the compressed region 74 with a small cross-sectional shape to the non-compressed region 71 with a greater cross-sectional shape. The covering member 78 is so mounted as to cover the boundary region 72 entirely.

Subsequently, the inflator 14 as coupled with the mounting bracket 16 is connected with the inlet port section 23 of the airbag 20, and the mounting brackets 11 are attached to the mounting regions 44 and 56 of the airbag 20, thereby forming an airbag module.

Then the mounting bracket 16 and mounting brackets 11 are placed at predetermined positions on the inner panel 2 of the vehicle body structure 1 and fixed there with the bolts 12 and 17. The inflator 14 is connected with a not-shown lead wire extending from the control device for actuating the inflator. If then the front pillar garnish 4, the roof head liner 5, pillar garnishes 6 and 7 are mounted on the inner panel 2, the airbag device M is mounted on the vehicle V.

When the airbag device M for head protection as mounted on board is actuated in the event of a side impact crash or a rollover of the vehicle V, the inflator 14 is actuated and feeds an inflation gas G to the airbag 20 (bag body 21). The airbag 20 is then inflated and breaks the shape-keeping members 77 and covering member 78, pushes and opens the airbag cover 9 composed of the lower rims 4a and 5a of the front pillar garnish 4 and roof head liner 5, unfolds and deploys downward, and covers the windows W1 and W2, center pillar CP, and a part of the rear pillar RP, as can be seen in FIG. 1 (double dotted lines) and 10 to 12.

Deployment behavior of the airbag package 70 of the airbag 20 is now described in detail. In the primary deployment area 26 (i.e. in the non-compressed region 71), as can be seen in (A), (B) and (C) of FIG. 11, an inflation gas G as fed via the inlet port section 23 flows through the gas feed path 29 of the shielding region 24 towards the front and rear, i.e. towards the supply ports 31a and 35a, while unfolding the folds L1 and L2 of the concertina portion 61, and flows into the main inflatable regions 31 and 35 via the supply ports 31a and 35a, then unrolls the rolled portion 62, such that the bag body 21 deploys the shielding region 24 along the windows W1 and W2 without throwing out the lower edge 21a region towards the interior I of the vehicle V, that is, deploys the shielding region 24 as close to the windows W1 and W2 as possible so as to avoid an engagement with an occupant. Meanwhile, as can be seen in (A), (B) and (C) of FIG. 12, the secondary deployment area 27 (i.e. the compressed region 74) also unfolds the folds L1 and L2 of the concertina portion 61 first and unrolls the rolled portion 62. However, the secondary deployment area 27 cannot unfold quickly due to burden of decompression, thus deploys later than the primary deployment area 26, as can be seen in (A), (B) and (C) of FIG. 10. Nevertheless, the occupant's head will be caught and protected quickly with the primary deployment area 26 which has already been deployed over the windows W1 and W2.

Figure 6:
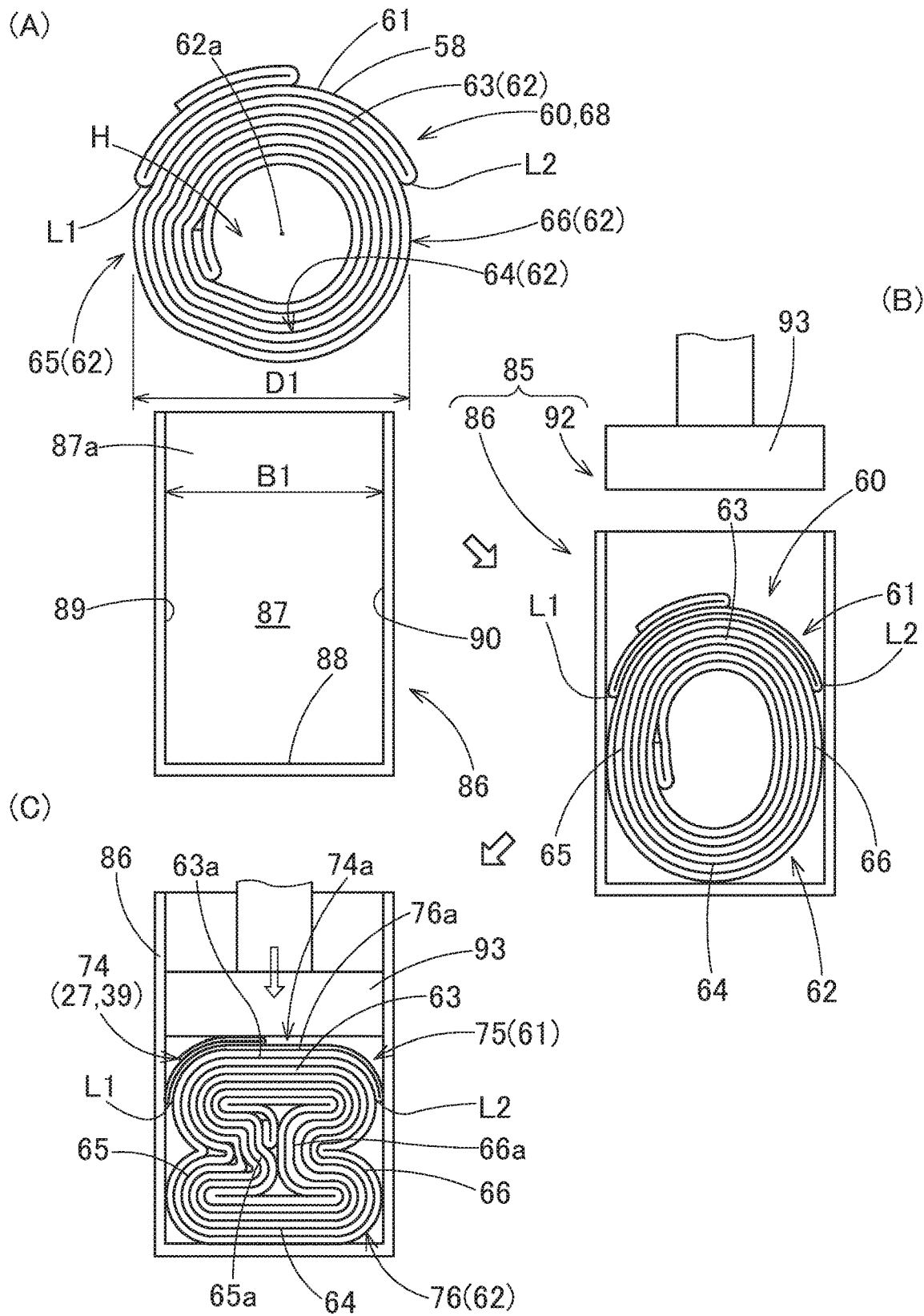
FIG. 6 schematically illustrates a process of forming a compressed region in the airbag as rolled.

In the airbag package 70 of the illustrated embodiment, as shown in (C) of FIG. 6, the compressed region 74 has such a cross-sectional shape that the four sectorial portions of the rolled portion 62 about the center 62a of the cross-sectional surface, i.e. the upper layered portion 63, lower layered portion 64 and left and right side layered portions 65 and 66, are compressed and gather towards the center 62a, and further, each of the left and right side layered portions 65 and 66 bends on the bent region 65a/66a and the bent regions 65a and 66a butt against each other in such a state that are packed between the upper layered portion 63 and lower layered portion 64. That is, the void space H formed around the center 62a of the rolled portion 62 is constricted due to the gathering movement of the upper layered portion 63, lower layered portion 64 and left and right side layered portions 65 and 66, and further disappears due to approximation of the bent regions 65a and 66a of the side layered portions 65 and 66. Thus the compressed region 74 has a generally quadrilateral cross-sectional shape with reduced vertical and transverse dimensions. In other words, the compressed region 74 of the illustrated embodiment includes a concertina compressed region 75 that is disposed on the upper side and formed by compressing the concertina portion 61 in an up and down direction, and a rolled compressed region 76 that is disposed immediately beneath the concertina compressed region 75 and formed by compressing the rolled portion 62 from above, below and sides, and the compressed region 74 has such a small cross-sectional shape that is generally a quadrilateral (in particular, a quadrilateral with four rounded corners) approximate to a square.

Therefore, with the airbag package 70 of the airbag 20 for head protection, the compressed region 74 has a small cross-sectional dimension and can be smoothly stored in a limited storage area in the front pillar FP.

In the illustrated embodiment, the upper layered portion 63 of the rolled portion 62, especially an outer portion 63a (see (C) of FIG. 6) of the upper layered portion 63, includes a region 62b of the rolled portion 62 that takes in an inflation gas G initially (namely, an initially inflatable region 62b, see (B) of FIG. 12), unlike the side layered portions 65 and 66 or lower layered portion 64. The initially inflatable region 62b of the illustrated embodiment has no dent region formed by compression work. Accordingly, the initially inflatable region 62b will be smoothly inflated and smoothly push out the remainder 62c of the rolled portion 62 which stays rolled, thus steadying the deployment direction of the remainder 62c of the rolled portion 62.

The airbag package 70 of the illustrated embodiment includes, above a region to form the rolled portion 62 in the airbag 20 (bag body 21) as laid flat (i.e. in a vicinity of the upper edge 21a of the airbag 20), an upper-reach region that is disposed in a farther upper reach of the inflation gas than the rolled portion 62. In the illustrated embodiment, an upper end region 39b (FIG. 2) of the terminal inflatable region 39, which adjoins and communicates with the inlet port 39a, constitutes the upper-reach region. In the compressed region 74 of the airbag package 70, the upper end region (in other words, an upper-reach region) 39b of the terminal inflatable region 39 forms a part of the concertina portion 61 and disposed on top of a top surface 76a (see (C) of FIG. 6) of the upper layered portion 63 of the rolled portion 62.

When the compressed region 74 of the illustrated embodiment is fed with an inflation gas G, the concertina portion 61 (i.e. the concertina compressed region 75) unfolds first. The concertina portion 61 of the illustrated embodiment is merely laid over the top surface 76a (see (C) of FIG. 6) of the upper layered portion 63 of the rolled portion 62 (i.e. the rolled compressed region 76), and the top surface 76a is a flat surface with no dents. With this configuration, when the concertina portion 61 unfolds first in such a manner that an initial inflatable region 61a and a second initial inflatable region 61b of the concertina portion 61 are inflated and unfold the folds L1 and L2, the concertina portion 61 will smoothly push the rolled portion 62 out of the storage area SP covered with the pillar garnish 4, as can be seen in (A), (B) and (C) of FIG. 12, which will assist with a smooth unrolling of the rolled portion 62 that follows.

Especially, in the illustrated embodiment, the compressed region 74 is disposed in a vicinity of the front end 70a of the airbag package 70 to be stored inside the front pillar FP forming a front rim of the window W1 of the vehicle V.

The front pillar FP is generally preferably thin in the light of widening of a view of a vehicle occupant, which results in a reduced storage area SP inside the front pillar FP. Nevertheless, the compressed region 74 of the illustrated embodiment with a small cross-sectional dimension will fit the storage area inside the front pillar FP smoothly.

In the illustrated embodiment, the shielding region 24 of the airbag 20 (bag body 21) includes more than one main inflatable regions 31 and 35 which are disposed one behind another, and the gas feed path 29 which is disposed at a vicinity of the upper end of the shielding region 24 and above the main inflatable regions 31 and 35. The gas feed path 29 is in gas communication with the inlet port section 23 and delivers an inflation gas G as sent from the inlet port section 23 to the main inflatable regions 31 and 35. The secondary deployment area 27 (i.e. the compressed region 74) is disposed in a vicinity of the terminal in a front and rear direction of the bag body 21 (or shielding region 24), apart from the supply port 31a via which the inflation gas G is fed into the main inflatable region 31 from the gas feed path 29.

When an inflation gas G is fed to the airbag package 70 of the illustrated embodiment, the gas G flows into the gas feed path 29 via the inlet port section 23 first, then flows into each of the main inflatable regions 31 and 35 via the supply ports 31a and 35a of the gas feed path 29. Since the compressed region 74, which requires a longer time for unfolding, is not disposed in a vicinity of the supply port 31a or 35a in the illustrated embodiment, the main inflatable regions 31 and 35 (i.e. the primary deployment area 26) will be able to be inflated and unfold to the lower edge 21b smoothly, in a steady deployment direction extending along the windows W1 and W2, thus covering the windows W1 and W2 quickly. Subsequently to the first deployment area 26, the secondary deployment area 27 is decompressed and unfolds though it takes a longer time. That is, the airbag package 70 configured as described above is able to unfold the non-compressed region 71 (i.e. the primary deployment area 26) to the lower edge 21b in a steady deployment direction quickly and deploy the same over the windows W1 and W2, then unfold the compressed region 74 (i.e. the secondary deployment area 27) smoothly as well in such a manner as to propagate the momentum of unfolding of the primary deployment area 26 to the secondary deployment area 27.

In the illustrated embodiment, especially, the shielding region 24 includes, in a vicinity of the front end 21a (in a vicinity of an end in a front and rear direction) of the shielding region 24, the terminal inflatable region 39 that adjoins the main inflatable region 31 and is partitioned from the main inflatable region 31 by the partitioning region 51 which extends in an up and down direction. The terminal inflatable region 39 is configured to receive an inflation gas G via the inlet port 39a which is disposed above the upper end 51a of the partitioning region 51. The compressed region 74 (i.e. the secondary deployment area 27) is disposed in an area extending from the inlet port 39a to the front end 21c (i.e. the end in the front and rear direction) of the shielding region 24.

That is, in the illustrated embodiment, the whole area of the terminal inflatable region 39 including the inlet port 39a constitutes the compressed region 74 (i.e. the secondary deployment area 27) while the non-compressed region 71 (i.e. the primary deployment area 26) is composed of the main inflatable regions 31 and 35, which are partitioned from the terminal inflatable region 39 by the partitioning region 51, and the gas feed path 29. With this configuration, when the airbag 20 is fed with an inflation gas G, the main inflatable regions 31 and 35 (i.e. the primary deployment area 26) unfolds to the lower edge 21b and cover the windows W1 and W2 quickly, as shown in FIGS. 10 and 11. Subsequently to the primary deployment area 26, the terminal inflatable region 39 (i.e. the compressed region 74, and the secondary deployment area 27) receives the inflation gas G via the inlet port 39a, and unfolds and inflates. That is, in the airbag package 70 of the illustrated embodiment, the main inflatable regions 31 and 35 are disposed at positions deployable close to the head of a vehicle occupant whereas the terminal inflatable region 39 (i.e. the compressed region 74, and the secondary deployment area 27) is disposed in a vicinity of the front end 21c of the shielding region 24, i.e. apart from the occupant's head in a front and rear direction. With this configuration, the airbag 20 is able to deploy the main inflatable regions 31 and 35 quickly for catching the occupant's head in an initial stage of airbag deployment, and when the occupant's head moves diagonally in a front and rear direction, the airbag 20 is able to catch it with the terminal inflatable region 39 which is deployed later than the main inflatable regions 31 and 35. Since the terminal inflatable region 39 (i.e. the secondary deployment area 27) has not yet unfolded in the initial stage of airbag deployment, the supply of the inflation gas G is concentrated on the primary inflatable area 26. As a consequence, the main inflatable regions 31 and 35 unfold and inflate quickly.

An area of the compressed region 74 (i.e. secondary deployment area 27) should not be limited to that described in the foregoing embodiment. By way of example, on condition that the main inflatable region 31 is able to cover the window W1 quickly by its major area, a front region of the main inflatable region 31 adjoining the partitioning region 51 and apart from the supply port 31a (by way of example, a region from the partitioning region 51 to a vicinity of the foremost mounting region 44F, as shown in FIG. 2) may be included in the compressed region 74 such that the terminal inflatable region 39 and the front region of the main inflatable region 31 apart from the supply port 31a form the compressed region 74 (i.e. secondary deployment area 27).

In the illustrated embodiment, moreover, the airbag package 70 includes the covering member 78 that is wound around a vicinity of the boundary region 72 of the compressed region 74 and the non-compressed region 71.

The boundary region 72 enlarges in diameter from the compressed region 74 with a small cross-sectional shape towards the non-compressed region 71 with a greater cross-sectional shape. As shown in (A) to (C) of FIG. 9, the airbag package 70 is bent on the boundary region 72 when transported, and straightened again when mounted on board. Without such a covering member 78 as described above, it would be likely that the bent region 72, in which the skin material 58 of the bag body 21 piles upon itself, is not restored to the original configuration due to frictional resistance or the like, but forms a bulge 73, as shown in (D) of FIG. 9, which would render the airbag package 70 unsuitable for mounting on the vehicle V. However, the covering member 78 will prevent the bent region 72 from bulging and help keep the bent region 72 in the original configuration even after straightening after bending, as shown in (A) to (C) of FIG. 9. Therefore, the airbag package 70 will be mounted on the vehicle smoothly.

Figure 8B:
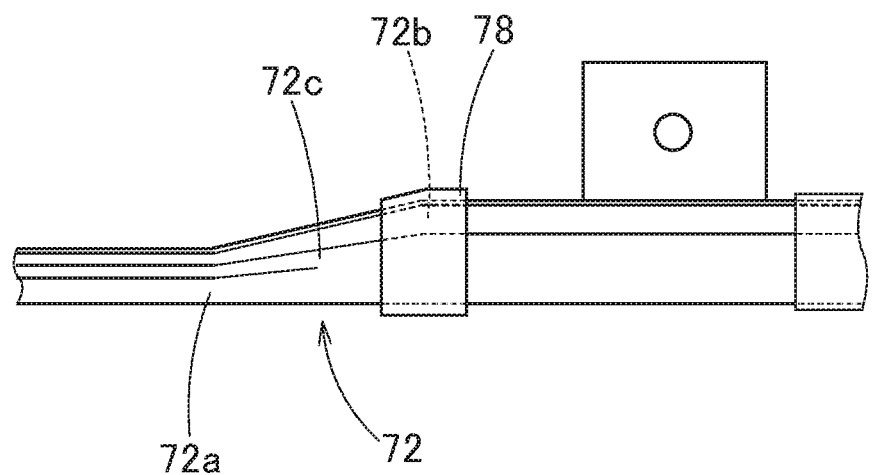
FIG. 8B is an enlarged front elevation of a portion of the airbag package on which a modification of the covering member is mounted.

The covering member 78 may be mounted on the outer circumference 72c of a whole area of the boundary region 72. i.e. from a small-diameter end 72a disposed towards the compressed region 74 to a great-diameter end 72b disposed towards the non-compressed region 71 as shown in FIG. 8A, or may be mounted around the great-diameter end 72b only, as shown in FIG. 8B. Further, as long as it can prevent a bulging of the boundary region 72, the covering member 78 may be mounted around a region of the non-compressed region 71 in proximity to the great-diameter end 72b.

Figure 13:
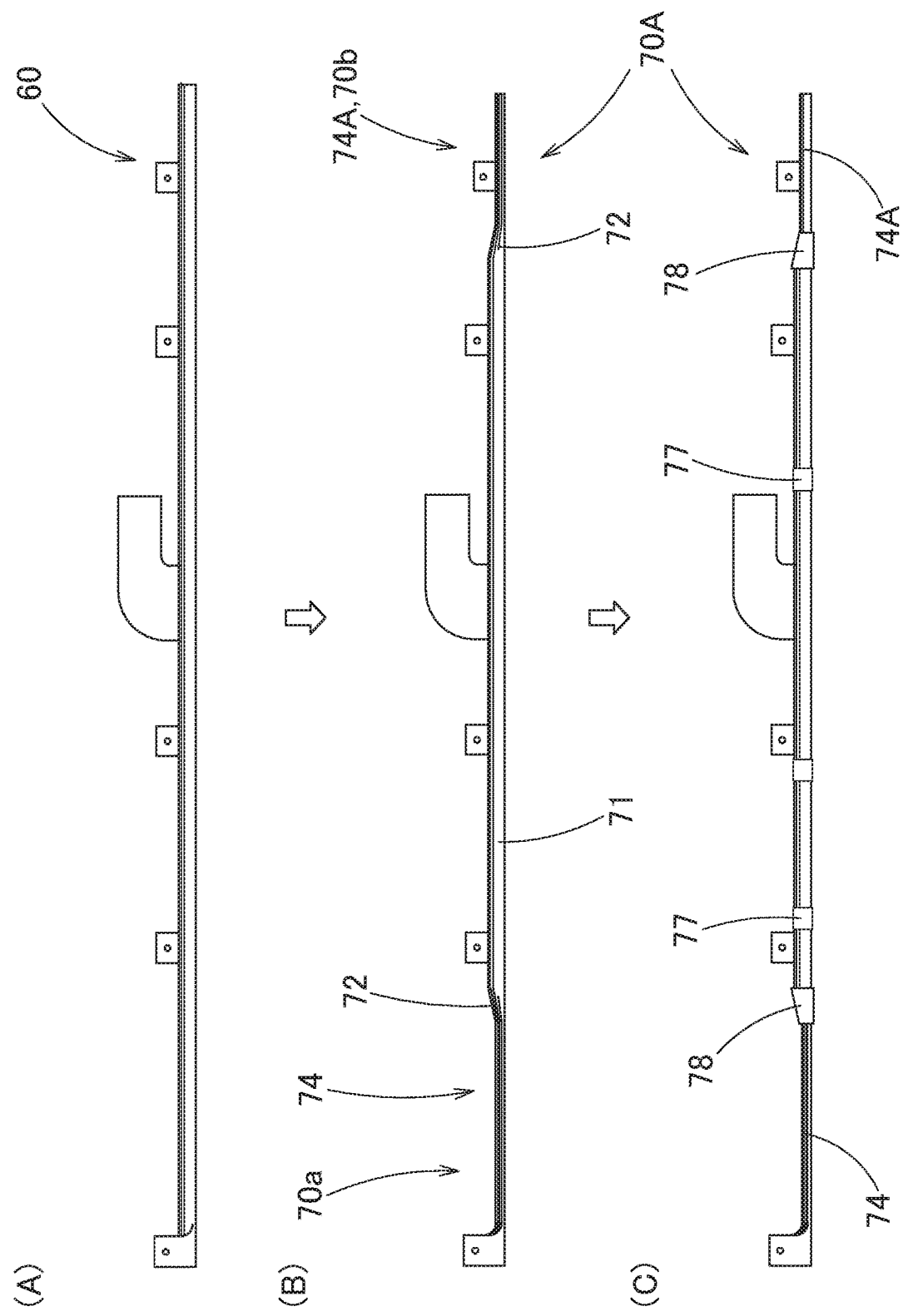
FIG. 13 illustrates a process of mounting a shape-keeping member and a covering member on an modification of the airbag package of the embodiment.

In the illustrated embodiment, the compressed region 74 is disposed only at the front end 70a of the airbag package 70. However, as shown in FIG. 13, an airbag package 70A may be provided with a compressed region 74A at the rear end 70b as well. The compressed region 74A is formed in a similar fashion to the compressed region 74. Specifically, the compressed region 74A is disposed proximate to the rear end 21d (FIG. 2) of the airbag 20 apart from the supply port 35a of the rear main inflatable region 35, so as not to hinder the unfolding and inflation of the main inflatable region 35 (i.e. the primary deployment area 26). This configuration provides the airbag package 70A with a greater area of the compressed regions 74 and 74A and renders the airbag package 70A compacter in size.

It will be understood that the compressed region 74 may be formed over an entire length of the airbag package 70 so as to fit a limited storage area on condition that the airbag 20 (bag body 21) is capable of covering the windows W1 and W2 quickly.

In the foregoing embodiment, the compressed region 74 is configured to have a generally quadrilateral (generally square) cross-sectional shape with rounded four corners. However, the cross-sectional shape of the compressed region 74 has only to be such a shape that the upper layered portion 63, lower layered portion 64 and side layered portions 65 and 66 have been brought close to the center 62a of the cross-sectional surface of the rolled portion 62 due to compression, with no dents on the upper layered portion 63 and with the bent region 65a/66a in each of the side layered portions 65 and 66. By way of example, the compressed region may be formed, in cross-sectional shape, into a polygon such as a quadrilateral, a round shape including a circle and an oval, or a semicircle.

Figure 14:
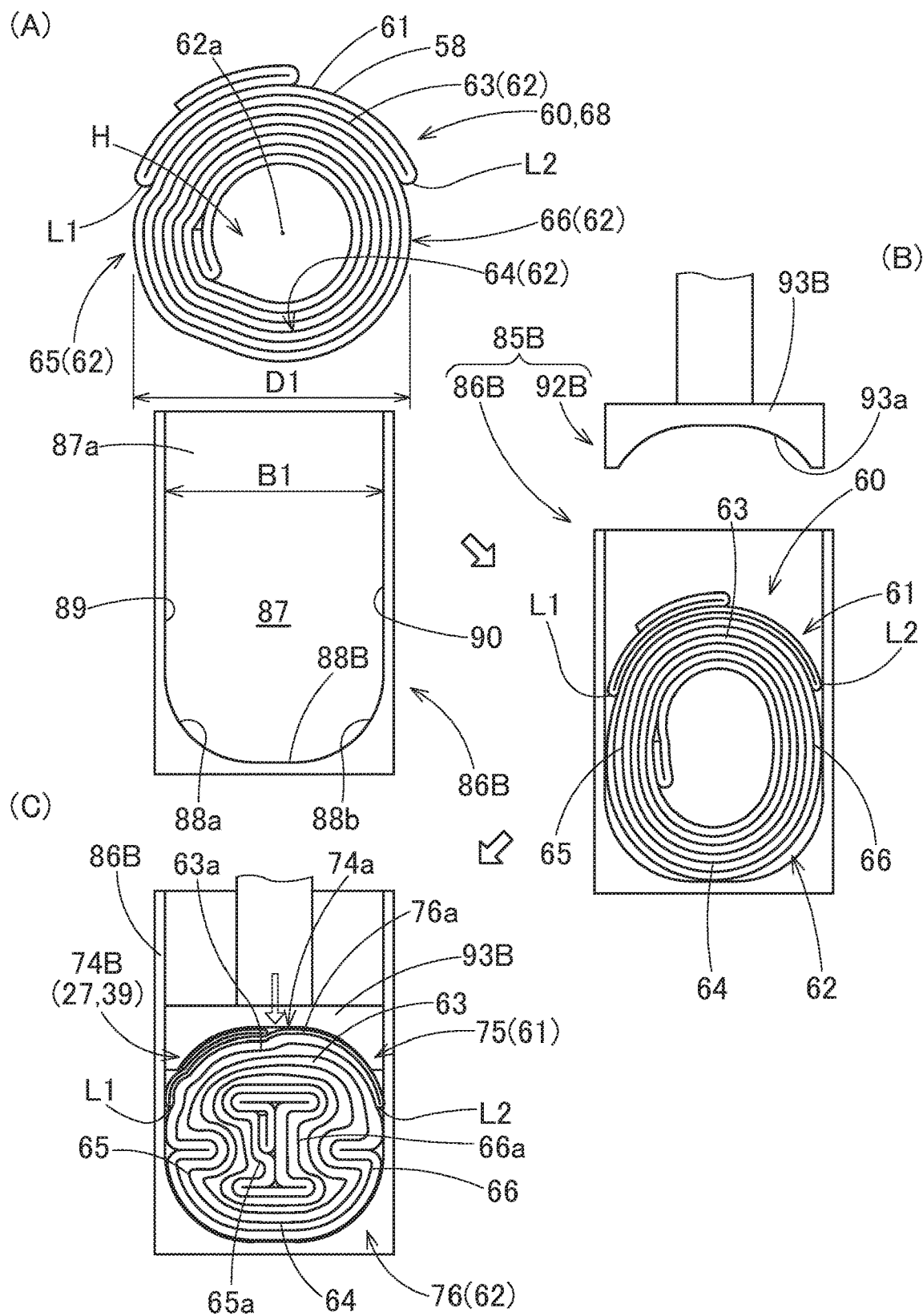
FIG. 14 schematically illustrates a process of forming a compressed region in another modification of the airbag package of the embodiment.

In order to form the cross-sectional shape of the compressed region into a circle, (or generally into a circle), a heating press 85B shown in FIG. 14 may be used. The heating press 85B is configured to compress a folded body 60 as pushed into a fixed mold 86B into a generally circular cross-sectional shape as shown in (C) of FIG. 14, and has following differences to the heating press 85 shown in FIG. 6. A press plate 93B of a movable mold 92B has a generally semi-arcuate molding surface 93a. A bottom plane 88B of the fixed mold 86B includes a generally quarter-arcuate surface at each of intersecting regions 88a and 88b with left and right side planes 89 and 90. The heating press 85B is similar to the heating press 85 shown in FIG. 6 in other configurations. In order to form a compressed region 74B with a circular (or generally circular) cross-sectional shape with the heating press 85B, an area 68 of a folded body 60, which is adapted to be subjected to compression, is pushed into a cavity 87 of the fixed mold 86B of the heating press 85B as can be seen in (A) and (B) of FIG. 14, then as can be seen in (B) and (C) of FIG. 14, the movable mold 92B is put into the cavity 87 to press the press plate 93B against the concertina portion 61 of the folded body 60, and held down towards the bottom plane 88B. If the folded body 60 thus compressed is heated for a predetermined time period, the compressed region 74B with a circular (or generally circular) cross-sectional shape is provided.

In the heating press 85B as well, an opening dimension B1 between the side planes 89 and 90 of the cavity 87 of the fixed mold 86B is smaller than an outside dimension (i.e. width) D1 in a left and right direction of the folded body 60 as the folds L1 and L2 of the concertina portion 61 are kept facing towards the rolled portion 62. Accordingly, the void space H in the folded body 60 as pushed into the cavity 87 is a little crushed in a left and right direction. Further, the folded body 60 is pushed into the cavity 87 such that the rolled portion 62 is brought into contact with the side planes 89 and 90 and bottom plane 88B of the mold 86B while the concertina portion 61 is disposed apart from the bottom plane 88B, i.e. at a vicinity of the opening 87a of the cavity 87.

When compressed as can be seen in (B) and (C) of FIG. 14, since the area 68 of the folded body 60 is pressed by the press plate 93B while constrained by the side planes 89 and 90, the concertina portion 61, the upper layered portion 63 and the lower layered portion 64 of the rolled portion 62 are each formed into such a shape as to curve generally along the press plate 93B or bottom plane 88B. In the meantime, the side layered portions 65 and 66 bend towards the void space H (towards each other) on bent regions 65a and 66a and crush the void space H. Thus the compressed region 74B is formed.

What is claimed is:

1. An airbag package of an airbag for head protection which is inflatable with an inflation gas for covering a window of a vehicle on an inner side of the window, the airbag package being formed by folding the airbag for storage in an upper periphery of the window, the airbag package comprising:
   a rolled portion that is formed by rolling a skin material of the airbag from a lower edge towards an upper edge of the airbag as laid flat, the rolled portion includes, in a cross-sectional surface thereof, an upper layered portion, a lower layered portion, and a pair of side layered portions that are disposed around a center of the cross-sectional surface of the rolled portion and each have layers of the skin material of the airbag; and
   a compressed region in which a void space formed at a center of the cross-sectional surface of the rolled portion has been crushed due to compression, the compressed region having such a cross-sectional shape that the upper layered portion, the lower layered portion and the pair of side layered portions have been brought close to the center of the cross-sectional surface of the rolled portion,
   wherein the pair of side layered portions in the compressed region are disposed between the upper layered portion and lower layered portion; and
   wherein each of the side layered portions in the compressed region bends generally at a center in an up and down direction thereof such that bent regions butt against each other and are packed between the upper layered portion and lower layered portion, thereby filling the void space.

2. The airbag package of claim 1, wherein:
   the airbag as laid flat includes, above a region to form the rolled portion, an upper-reach region that is disposed in a farther upper reach of the inflation gas than the rolled portion; and
   the airbag package further includes, on the upper layered portion of the rolled portion in the compressed region, a concertina portion that is composed of the upper-reach region folded in a concertina fashion.

3. The airbag package of claim 1, wherein the compressed region is disposed at a vicinity of a front end of the airbag package so as to be stored inside a front pillar of the vehicle which forms a front rim of the window.

4. The airbag package of claim 3, further comprising a non-compressed region at the rear of the compressed region.

5. The airbag package of claim 4, further comprising:
   a boundary region of the compressed region and the non-compressed region, the boundary region enlarging in diameter from the compressed region with a small cross-sectional surface towards the non-compressed region with a greater cross-sectional surface; and
   a covering member that is wound around the boundary region and is breakable at airbag deployment.

6. The airbag package of claim 1, wherein a cross-sectional shape of the compressed region is generally a quadrilateral with four rounded corners.

7. The airbag package of claim 1, wherein a cross-sectional shape of the compressed region is generally a circle.

8. A method of production of an airbag package of an airbag for head protection which is inflatable with an inflation gas for covering a window of a vehicle on an inner side of the window, the method of production comprising:

rolling a skin material of the airbag from a lower edge towards an upper edge of the airbag as laid flat so as to form a folded body that includes a rolled portion and a void space disposed at a center of a cross-sectional surface of the rolled portion, wherein the rolled portion includes, around a center of the cross-sectional surface, an upper layered portion, a lower layered portion, and a pair of side layered portions each of which has layers of the skin material;

providing a cavity that includes a bottom plane, a pair of side planes and an opening whose width is smaller than an outside dimension of the folded body of the airbag;

pushing the folded body of the airbag into the cavity such that the rolled portion is brought into contact with the bottom plane and side planes of the cavity; and compressing the folded body towards the bottom plane of the cavity and forming a compressed region in which each of the side layered portions bends generally at a center in an up and down direction thereof between the upper layered portion and the lower layered portion, and bent regions of the side layered portions butt against each other and eliminate the void space of the rolled portion.

9. The method of production of an airbag package of claim 8, wherein:

the airbag for head protection as laid flat includes, above a region to form the rolled portion, an upper-reach region that is disposed in a farther upper reach of the inflation gas than the rolled portion; and the method further comprises:

folding the upper-reach region in a concertina fashion on one or more folds to form a concertina portion;

placing the concertina portion on the upper layered portion of the rolled portion to finish the folded body; and when pushing the folded body into the cavity before the compressing, making the folds of the concertina portion face towards the rolled portion.

\* \* \* \* \*